(12) United States Patent
Chen

(10) Patent No.: US 7,701,787 B2
(45) Date of Patent: Apr. 20, 2010

(54) MEMORY CONTROLLER AND OUTPUT SIGNAL DRIVING CIRCUIT THEREOF

(75) Inventor: Yi-Lin Chen, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 168 days.

(21) Appl. No.: 11/944,407

(22) Filed: Nov. 21, 2007

(65) Prior Publication Data

US 2008/0123440 A1  May 29, 2008

(30) Foreign Application Priority Data

Nov. 23, 2006  (TW) .............................. 95143356 A

(51) Int. Cl.
G11C 7/00  (2006.01)
(52) U.S. Cl. ........................ 365/189.11; 365/189.05; 365/189.15; 365/189.17
(58) Field of Classification Search ............ 365/189.11, 365/189.05, 189.15, 189.17
See application file for complete search history.

(56) References Cited

U.S. PATENT DOCUMENTS

| 5,448,181 | A | * | 9/1995 | Chiang ........................ 326/27 |
| 5,751,179 | A | * | 5/1998 | Pietruszynski et al. ...... 327/379 |
| 6,066,977 | A | * | 5/2000 | Felton et al. ................ 327/390 |
| 6,903,581 | B2 | | 6/2005 | Clark |
| 6,930,622 | B2 | | 8/2005 | Brede |

* cited by examiner

Primary Examiner—Son Dinh
(74) Attorney, Agent, or Firm—Winston Hsu

(57) ABSTRACT

A memory controller for controlling a memory, where the memory controller includes: a pad, coupled to the memory, for generating an output signal to the memory according to a signal value of the memory controller; a voltage pull-up device, coupled to the pad, comprising a first N type transistor and for pulling up a voltage level on the pad according to the signal value; and a voltage pull-down device, coupled to the pad, comprising a second N type transistor and for pulling down the voltage level on the pad according to the signal value.

32 Claims, 2 Drawing Sheets

MEMORY CONTROLLER AND OUTPUT SIGNAL DRIVING CIRCUIT THEREOF

BACKGROUND OF THE INVENTION

1. Field of the Invention

The present invention relates to a memory controller, and particularly relates to an output signal driving circuit of the memory controller.

2. Description of the Prior Art

As CPU performance has greatly improved in recent years, memory bandwidth has become a serious restriction to a computer system's performance. Therefore, semiconductor and chip manufacturers have developed new memory standards and bus techniques to solve the memory bandwidth problem. For example, a memory standard known as DDR (Double data rate) has been developed, which comprises DDRI, DDRII standard, and the newest DDRIII standard.

However, while new memory interfacing standards can greatly increase memory data access amount, semiconductor manufacturers such as TSMC and UMC are having difficulty providing optimal ASIC (Application Specific Integrated Circuit) manufacturing processes that can make the most use out of these new memory standards. According to the DDR standard by JDEC, DDRI type memory conforms to the SSTL-25 standard, which prescribes an I/O port voltage of 2.5V; DDRII type memory conforms to the SSTL-18 standard, which prescribes an I/O port voltage of 1.8V; and DDRIII type memory conforms to the SSTL-15 standard, which prescribes an I/O port voltage of 1.5V.

That being the case, the ASIC process provided by the semiconductor manufacturers normally only distinguishes between two types of device: low voltage devices and high voltage devices. It should be noted that the major difference between the high voltage device and the low voltage device is the thickness of their gate oxide. The high voltage device has a thicker gate oxide layer than the low voltage device, and one major function of the high voltage device is to be applied in I/O circuitry. Taking a widely seen standard CMOS process as an example, for a 0.25 um, 0.18 um, 0.13 um, or even smaller-size process, the high voltage device is usually nominally applied with a supply voltage of 3.3V.

Generally speaking, conventionally when designing an output signal driving circuit of a memory controller, PMOS transistors are used as voltage pull-up device and NMOS transistors are used as voltage pull-down device, such that a voltage value on an I/O pad can be pulled up/down according to the operation of the memory controller. However, as described above, because a high-voltage device commonly used for I/O circuitry is optimally operable under a power supply voltage of 3.3V, if such a memory device is to be operated in conformity with DDRI (2.5V), DDRII (1.8V), or DDRIIII (1.5V) standard, the operation voltage becomes insufficiently large for the voltage pull-up device implemented by a PMOS transistor. In this case, the size of the PMOS transistor is usually increased, i.e., the device width increased, such that the ability for draining current of the PMOS transistor can be enhanced. Such a structural change will significantly increase the area of the I/O pad.

SUMMARY OF THE INVENTION

Therefore, one objective of the present invention is to provide an output signal driving circuit, which uses an N type transistor device as the voltage pull-up device, to pull up a voltage value of the pad.

One embodiment of the present invention discloses a memory controller for controlling a memory, comprising: a pad, coupled to the memory, for generating an output signal to the memory according to a signal value of the memory controller; a voltage pull-up device, coupled to the pad, comprising a first N type transistor and for pulling up a voltage level on the pad according to the signal value; and a voltage pull-down device, coupled to the pad, comprising a second N type transistor and for pulling down the voltage level on the pad according to the signal value.

Another embodiment of the present invention discloses an output signal driving circuit, comprising: a pad, for generating an output signal according to a signal value of a core circuit; a voltage pull-up device, coupled to the pad, comprising a first N type transistor and for pulling up a voltage level on the pad according to the signal value; and a voltage pull-down device, coupled to the pad, comprising a second N type transistor and for pulling down the voltage level on the pad according to the signal value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

Figure 1:
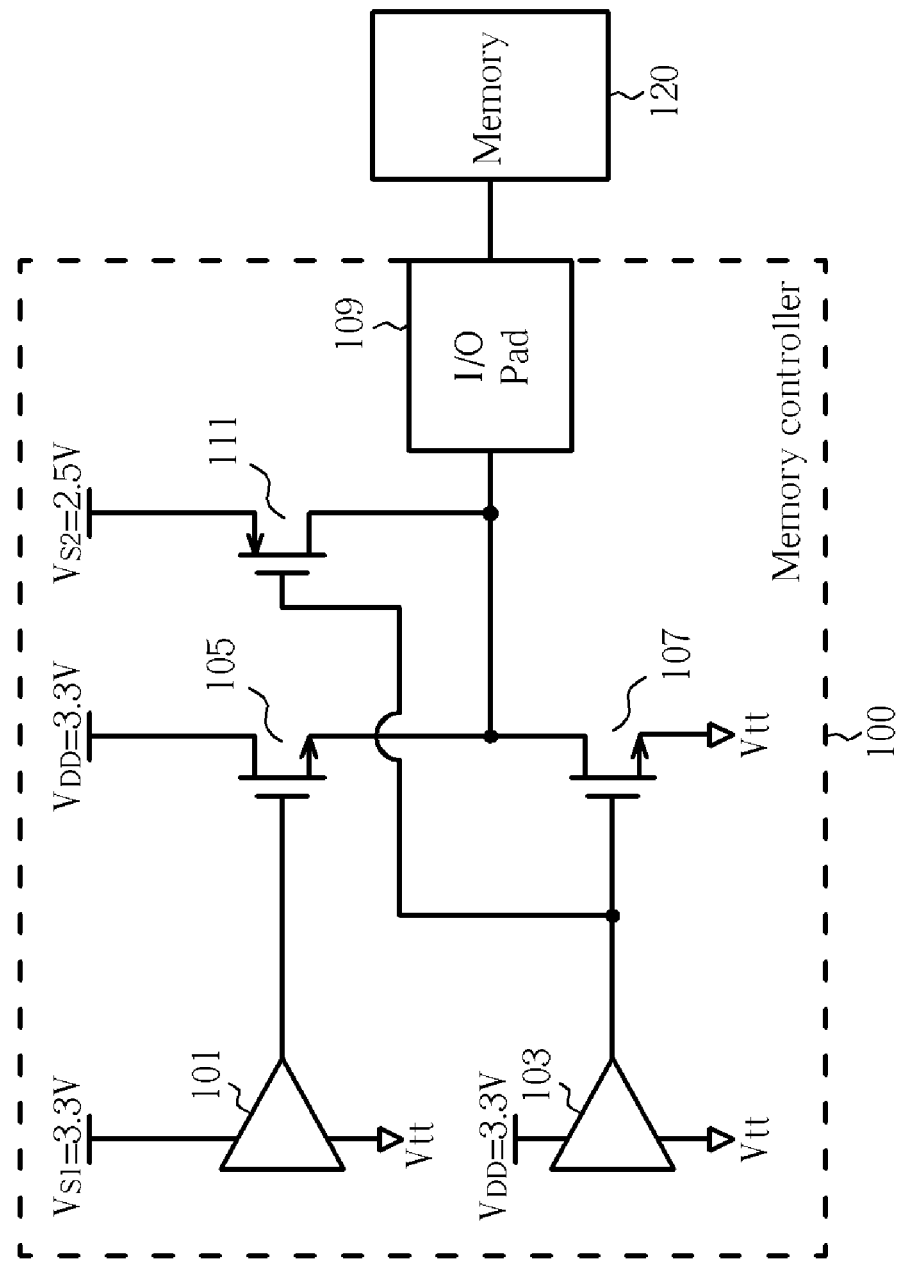
FIG. 1 illustrates an output signal driving circuit according to a preferred embodiment of the present invention.

Please refer to FIG. 1. FIG. 1 illustrates an output signal driving circuit according to a preferred embodiment of the present invention. In this embodiment, a memory controller chip conforming to the DDRI transmission standard is taken as an example to explain the output signal driving circuit, but is not meant to limit the scope of the present invention. Other transmission standards, such as DDR II or DDR III transmission standards, other to-be-developed standards, or even certain fields of application other than memory technology, can also adopt the present invention. The technique is especially advantageous for the manufacturing of memory controller chips due to the characteristics of DDR memory transmission standard, i.e., the I/O port voltage conforming to DDR transmission standard.

As shown in FIG. 1, the output signal driving circuit is utilized for driving an I/O pad 109 according to a signal value S generated from a core circuit (not illustrated) of the memory controller 100, such that an operation of a memory coupled to the memory controller 100 can be controlled. The output signal driving circuit includes pre-drivers 101 and 103, a voltage pull-up device 105, a voltage pull-down device 107, and a static pull-up device 111. The pre-drivers 101 and 103 are used for performing pre-driving to the voltage pull-up device 105 and the voltage pull-down device 107 respectively according to a signal value S and an inverted signal SB thereof. The voltage pull-up device 105 and the voltage pull-down device 107 are used for pulling up or down the voltage value on the pad 109 correspondingly.

In this embodiment, standard CMOS processes of 0.25 um, 0.18 um, or 0.13 um are taken as examples. Generally speaking, the circuit design of an I/O circuit preferably utilizes high voltage devices; therefore the above-mentioned devices 101, 103, 105, 107, and 111 in this embodiment are all high voltage devices suitable for operating at 3.3V. The output signal driving circuit according to the present embodiment also operates at a 3.3V nominal power supplying voltage $V_{DD}$. Specifically, the pre-driver 103 operates at $V_{DD}$=3.3V, and the voltage pull-up device 105 and the voltage pull-down device 107 also operate at $V_{DD}$=3.3V.

The point of the present embodiment is that, not only is the voltage pull-down device 107 an N type transistor (an NMOS transistor in this embodiment), but the voltage pull-up device 105 is also an N type transistor (an NMOS transistor in this embodiment). Also, in order to accommodate the operation of the voltage pull-up device 105 utilizing an NMOS transistor, the pre-driver, coupled in the front, operates at a first power supplying voltage $V_{S1}$. Since the present embodiment follows the DDRI transmission standard, i.e., conforming to the SSTL-25 standard, the voltage on the I/O port of the memory is 2.5V. Therefore, the first power supplying voltage $V_{S1}$ is set to be 3.3V, such that when this signal value S is at its high level, the voltage value on the pad 109 will, because of the source follower effect observed on the voltage pull-up device 105 realized by an NMOS transistor, be a voltage level lower than the first power supplying voltage $V_{S1}$ (3.3V) by a threshold voltage value $V_{TH}$ (0.7V~0.8V); in other words, a 2.5V voltage level as prescribed by the DDRI transmission standard.

Since the pad voltage generated according to the above-mentioned mechanism is not sufficiently stable, the output signal driving circuit can further comprise a static pull-up device 111. In this embodiment, the static pull-up device 111 is implemented by a PMOS transistor coupled to an output terminal of the pre-driver 103 at the gate of the PMOS transistor, the device size of which can be set significantly smaller as compared with the voltage pull-up device 105 and the voltage pull-down device 107. The static pull-up device 111 is used for constantly conducting the pad 109 and a second power supplying voltage $V_{S2}$, which is 2.5V in this embodiment, such that the voltage level of the pad 109 can be stably kept at 2.5V. However, as known by persons skilled in the art, the implementation of the static pull-up device 111 is not limited to the disclosure of the present embodiment, and is not a necessary device for implementing the concept of the present invention.

As described above, the output signal driving circuit according to the present embodiment utilizes an N type transistor as the voltage pull-up device 105, which utilizes a specific voltage drop (the $V_{TH}$) resulting from the source follower effect, to keep the output voltage on the pad at a desired value, such that the voltage pull-up device 105 can operate at a most suitable operation voltage (i.e. $V_{DD}$=3.3V). Thereby the current draining ability and the area of the voltage pull-up device are not sacrificed.

Figure 2:
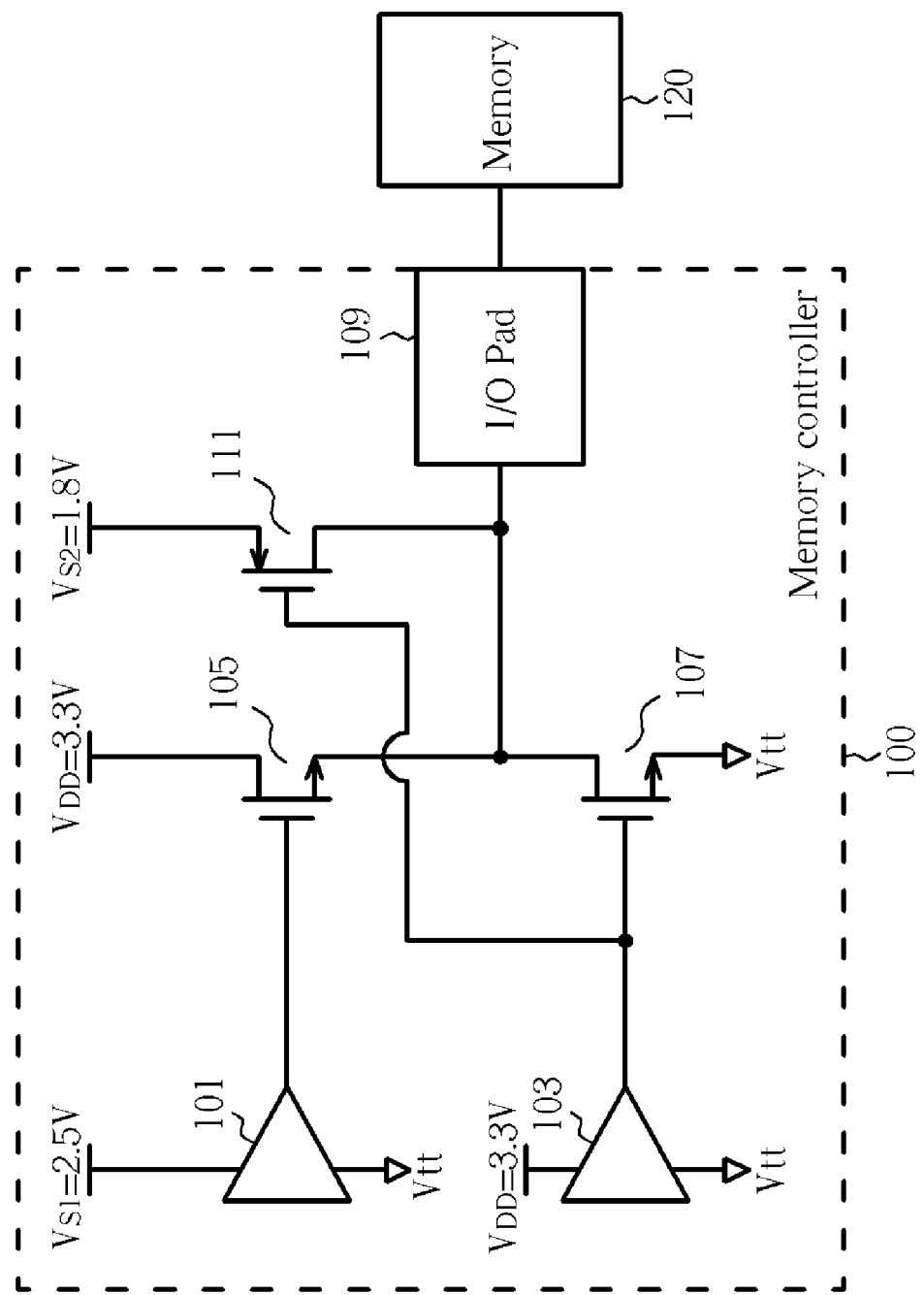
FIG. 2 illustrates an output signal driving circuit according to another embodiment of the present invention.

The same design can also be utilized with the DDRII transmission standard. Please refer to FIG. 2. FIG. 2 illustrates an output signal driving circuit according to another embodiment of the present invention. The structure of the output signal driving circuit shown in FIG. 2 is in many respect the same as that shown in FIG. 1. The difference lies in that, in order to conform to the DDRII transmission standard, or the SSTL-18 standard, and consequently the voltage on the I/O port of the memory being of 1.8 V, the first power supplying voltage $V_{S1}$ is set to 2.5V, and the second power supplying voltage $V_{S2}$ is set to 1.8V. By doing so, after a $V_{TH}$ drop of the voltage pull-up device 105, the voltage on the I/O port of the memory becomes approximately 1.8V, which is as prescribed by the DDRII transmission standard. According to the same line and after understanding the embodiments as illustrated in FIG. 1 and FIG. 2, a person of ordinary skill in the pertinent art will be able to extend the design of the present invention to other standards, such as DDRIII.

It should be noted that in general practice, the nominal power supplying voltage VDD, the first power supplying voltage $V_{S1}$, and the second power supplying voltage $V_{S2}$ are provided by circuitry external to the memory controller chip 100, for example, by a power supplying device on a printed circuit board. Therefore, the memory controller chip described in the above-mentioned embodiments can be directly incorporated into a memory system conforming to various memory transmission standards, such as DDRI, DDRII, or DDRIII, by simply properly adjusting the power supplying voltages introduced into the chip.

According to the above-mentioned embodiments, a desired output voltage of a memory controller can be obtained without increasing the area of the memory controller.

Those skilled in the art will readily observe that numerous modifications and alterations of the device and method may be made while retaining the teachings of the invention.

What is claimed is:

1. A memory controller for controlling a memory, comprising:
    a pad, coupled to the memory, for outputting an output signal to the memory according to a signal value of the memory controller;
    a voltage pull-up device, coupled to the pad, comprising a first N type transistor and for pulling up a voltage level on the pad according to the signal value;
    a voltage pull-down device, coupled to the pad, comprising a second N type transistor and for pulling down the voltage level on the pad according to the signal value; and
    a first pre-driver coupled to the voltage pull-up device, for outputting a first pre-driver signal to the voltage pull-up device according to the signal value;
    wherein the voltage level on the pad is pulled up to a predetermined value according to a transmission standard, where a first power supply voltage utilized by the first pre-driver approaches a value equal to the predetermined value plus a threshold voltage of the first N type transistor.

2. The memory controller of claim 1, further comprising a second pre-driver, coupled to the voltage pull-down device, for outputting a second pre-driver signal to the voltage pull-down device according to the signal value.

3. The memory controller of claim 1, wherein the voltage pull-up device and the voltage pull-down device are coupled to each other in a cascade structure.

4. The memory controller of claim 3, being a semiconductor chip manufactured via a standard CMOS process, wherein the first and second N type transistors are high voltage devices of the standard CMOS process, and the voltage pull-up device and the voltage pull-down device operate at a constant power supplying voltage suitable for high voltage devices.

5. The memory controller of claim 1, further comprising a static pull-up device coupled to the pad and a second power supplying voltage.

6. The memory controller of claim 5, wherein the voltage level on the pad is pulled up to a predetermined value according to a transmission standard, where a voltage value of the second power supplying voltage equals the predetermined value.

7. The memory controller of claim 5, wherein the static pull-up device comprises a P type transistor.

8. The memory controller of claim 1, following a DDR transmission standard.

9. An output signal driving circuit, comprising:
- a pad, for outputting an output signal according to a signal value of a core circuit;
- a voltage pull-up device, coupled to the pad, comprising a first N type transistor and for pulling up a voltage level on the pad according to the signal value;
- a voltage pull-down device, coupled to the pad, comprising a second N type transistor and for pulling down the voltage level on the pad according to the signal value;
- a first pre-driver coupled to the voltage pull-up device, for outputting a first pre-driver signal to the voltage pull-up device according to the signal value; and
- wherein the voltage level on the pad is pulled up to a predetermined value according to a transmission standard, and a first power supply voltage utilized by the first pre-driver approaches a value equal to the predetermined value plus a threshold voltage of the first N type transistor.

10. The output signal driving circuit of claim 9, wherein the transmission standard is a DDR memory transmission standard.

11. The output signal driving circuit of claim 9, further comprising a second pre-driver coupled to the voltage pull-down device, for outputting a second pre-driver signal to the voltage pull-down device according to the signal value.

12. The output signal driving circuit of claim 9, wherein the voltage pull-up device and the voltage pull-down device are coupled to each other in a cascade structure.

13. The output signal driving circuit of claim 12, being a semiconductor chip manufactured via a standard CMOS process, wherein the first and second N type transistors are high voltage devices of the standard CMOS process, and the voltage pull-up device and the voltage pull-down device operate at a constant power supplying voltage suitable for high voltage devices.

14. The output signal driving circuit of claim 9, further comprising a static pull-up device, coupled to the pad and a second power supplying voltage.

15. The output signal driving circuit of claim 14, wherein the voltage level on the pad is pulled up to a predetermined value according to a transmission standard, where a voltage value of the second power supplying voltage equals the predetermined value.

16. The output signal driving circuit of claim 14, wherein the static pull-up device comprises a P type transistor.

17. A memory controller for controlling a memory, comprising:
- a pad, coupled to the memory, for outputting an output signal to the memory according to a signal value of the memory controller;
- a voltage pull-up device, coupled to the pad and a first power supplying voltage, comprising a first N type transistor and for pulling up a voltage level on the pad according to the signal value; and
- a voltage pull-down device, coupled to the pad, comprising a second N type transistor and for pulling down the voltage level on the pad according to the signal value; and
- a static pull-up device coupled to the pad and a second power supplying voltage.

18. The memory controller of claim 17, further comprising a first pre-driver coupled to the voltage pull-up device, for outputting a first pre-driver signal to the voltage pull-up device according to the signal value.

19. The memory controller of claim 18, further comprising a second pre-driver, coupled to the voltage pull-down device, for outputting a second pre-driver signal to the voltage pull-down device according to the signal value.

20. The memory controller of claim 17, wherein the voltage pull-up device and the voltage pull-down device are coupled to each other in a cascade structure.

21. The memory controller of claim 20, being a semiconductor chip manufactured via a standard CMOS process, wherein the first and second N type transistors are high voltage devices of the standard CMOS process, and the voltage pull-up device and the voltage pull-down device operate at a constant power supplying voltage suitable for high voltage devices.

22. The memory controller of claim 17, wherein the voltage level on the pad is pulled up to a predetermined value according to a transmission standard, where a voltage value of the second power supplying voltage equals the predetermined value.

23. The memory controller of claim 17, wherein the static pull-up device comprises a P type transistor.

24. The memory controller of claim 17, following a DDR transmission standard.

25. An output signal driving circuit, comprising:
- a pad, for outputting an output signal according to a signal value of a core circuit;
- a voltage pull-up device, coupled to the pad and a first power supplying voltage, comprising a first N type transistor and for pulling up a voltage level on the pad according to the signal value;
- a voltage pull-down device, coupled to the pad, comprising a second N type transistor and for pulling down the voltage level on the pad according to the signal value; and
- a static pull-up device, coupled to the pad and a second power supplying voltage.

26. The output signal driving circuit of claim 25, further comprising a first pre-driver coupled to the voltage pull-up device, for outputting a first pre-driver signal to the voltage pull-up device according to the signal value.

27. The output signal driving circuit of claim 26, wherein the transmission standard is a DDR memory transmission standard.

28. The output signal driving circuit of claim 26, further comprising a second pre-driver coupled to the voltage pull-down device, for outputting a second pre-driver signal to the voltage pull-down device according to the signal value.

29. The output signal driving circuit of claim 25, wherein the voltage pull-up device and the voltage pull-down device are coupled to each other in a cascade structure.

30. The output signal driving circuit of claim 29, being a semiconductor chip manufactured via a standard CMOS process, wherein the first and second N type transistors are high voltage devices of the standard CMOS process, and the voltage pull-up device and the voltage pull-down device operate at a constant power supplying voltage suitable for high voltage devices.

31. The output signal driving circuit of claim 25, wherein the voltage level on the pad is pulled up to a predetermined value according to a transmission standard, where a voltage value of the second power supplying voltage equals the predetermined value.

32. The output signal driving circuit of claim 25, wherein the static pull-up device comprises a P type transistor.

* * * * *